United States Patent [19]

Portmann

[11] 4,412,215

[45] Oct. 25, 1983

[54] NOVEL CONTROL MEANS FOR AN ELECTROCHROMIC DISPLAY

[75] Inventor: Hubert Portmann, Colombier, Switzerland

[73] Assignee: Ebauches, S.A., Switzerland

[21] Appl. No.: 357,298

[22] Filed: Mar. 11, 1982

Related U.S. Application Data

[63] Continuation of Ser. No. 119,140, Feb. 5, 1980.

[30] Foreign Application Priority Data

Feb. 16, 1979 [CH] Switzerland .......................... 1535/79

[51] Int. Cl.³ ............................................... G09G 3/34
[52] U.S. Cl. .................................... 340/785; 340/805; 340/812; 350/357
[58] Field of Search ................ 350/357, 363; 340/812, 340/785, 805, 789, 811

[56] References Cited

U.S. PATENT DOCUMENTS

| 4,137,523 | 1/1979 | Mukaiyama | 340/805 |
| 4,160,241 | 7/1979 | Shimizu et al. | 340/812 |
| 4,201,984 | 5/1980 | Inami et al. | 340/812 |
| 4,228,431 | 10/1980 | Barclay et al. | 350/357 |
| 4,364,041 | 12/1982 | Fukuda et al. | 340/785 |

*Primary Examiner*—Marshall M. Curtis
*Attorney, Agent, or Firm*—Allegretti, Newitt, Witcoff & McAndrews, Ltd.

[57] ABSTRACT

An electrochromic display cell has several electrode segments 1 spaced from a common counter-electrode 3 by an electrolyte 2 and disposed to represent different symbols according to those segments on which a coloured or effaced state is conferred by application of a current in one direction or in the other between the segments and the counter-electrode. To achieve one of the current directions a bias voltage provided by a generator 16 is applied for a fixed time by a switching circuit T1, T2 to a field-effect transistor T6 which completes a circuit through the cell 4, electrode 3, electrolyte 2 and segment 1. The transistors 6 have channel widths proportional to the segment areas so that all segments receive the same charge per unit area. The segments whose state is to change in the other direction are short-circuited with the counter-electrode by transistors T7. The display is particularly useful for the display of time data on watches.

2 Claims, 2 Drawing Figures

NOVEL CONTROL MEANS FOR AN ELECTROCHROMIC DISPLAY

This is a continuation of application Ser. No. 119,140 filed Feb. 5, 1980.

BACKGROUND OF THE INVENTION

This invention relates to electrochromic display cells and concerns novel control means for an electrochromic display designed to improve the appearance and readability of the symbols displayed. The invention is particularly useful in the horological industry as a means of displaying the time in digital or analogue form.

An electrochromic display cell is constituted by an electrochromic material, capable of assuming two different appearances under the effect of electric currents and arranged in the form of separate electrode segments, separated from a common counter-electrode by an electrolyte. Associated electrical circuits allow a predetermined voltage to be applied to each segment individually with respect to the common counter-electrode. The current which then passes makes each of the segments take on one or other of two different appearances. These appearances are generally distinguished as the coloured, or displayed, state and the colourless or effaced state. The segments are arranged on the surface of the display cell so as to represent figures or other symbols, according to the combinations of coloured or colourless states they are capable of assuming. In displays of hours or dates, for example, it is customary to arrange seven segments for one character, so that this character can appear whenever required as any one of the numbers 0 to 9, according to the number and position of the segments made visible by colouring.

In some instances, several counter-electrodes are provided, each corresponding to one part of the electrode segments.

It is also known that one of the particular characteristics of electrochromic cells which, moreover, is a reason for their success in apparatuses supplied by low-powered batteries, e.g., watches, is the persistence of both states, the main function of the energy consumed being to effect changes in state, by colouring or effacing, and not to hold the cells in a predetermined state.

This type of behavior, which can be compared with that of capacitors, involves requirements specific to the supplying and control of the electrochromic display cells. The contract between a segment and the background of the display is determined by the electric charge injected per unit of surface of the segment to cause its change of state, the light absorption coefficient of the electrochromic material being proportional to this charge. It is essential for the quantity of charge injected at each change of state to be constant, precisely regulated and adapted to each segment. It is even more desirable that, in a display system like that for watches, where the characters change at a regular rate to represent in succession all the symbols, in a constantly repeated cycle, provision be made to limit the changes of state to the single segments which have to appear or disappear during the change from one figure to the next. Consequently, after each change of state, a segment must present a well determined contrast so that the displayed number is uniform. One also seeks to avoid variations occurring in the internal impedance of the display cells as a function of age and temperature, as well as those of differences in resistance of the connections connecting the segments to their control circuits. Finally, it is desirable to vary, from one segment to the other, the quantity of charge injected, at each change of state, to allow for differences in area between the segments.

The control circuits usually associated with electrochromic cells do not allow these objectives to be achieved. They are in fact simply constituted by electronic switches applying a constant voltage for a predetermined time to the segments to be controlled. The current which then circulates, and consequently the quantity of charge injected, is dependent upon various parameters which are difficult to regulate and vary from one segment to another. The contrast thus obtained is consequently not the same for all segments.

Swiss patent specification No. 609,408 describes an apparatus for controlling the segments of an electrochromic display which comprises for each segment a source of current capable of supplying a constant current for both directions of colour-change. This apparatus has the disadvantage of necessitating two sources of supply voltage supplying respectively a positive voltage and a negative voltage with respect to a mean potential. With such an apparatus, it is also very difficult, not to say impossible, to obtain, during the effacing stage, exactly the same quantity of charge as that supplied during the colouring stage.

If the colouring charge is larger than the effacing charge, even if only by a very small amount, the difference between these two charges accumulates in the segment, which then presents a residual colouring which increases with each change of state. The segment will consequently gradually become visible even when it should be effaced, and the contrast that it presents when it should normally be coloured increases, which can be bad for the cell in the long term.

In the opposite case, the voltage between the segment and the counter-electrode increases, when effacing finishes, to the value of the supply voltage, which also badly affects the display cell in the long term.

To obtain a contrast which is uniform and constant in time, the charges supplied to the segments during one of their changes of state must be individually matched by the charges applied during the other changes of state.

BRIEF SUMMARY OF THE INVENTION

The invention provides an improved method and apparatus for controlling an electrochromic display cell having a plurality of electrode segments spaced from a counter-electrode by an electrolyte and disposed for representing different symbols according to those segments which are set in a coloured state or in an effaced state by application of a current in one direction or in the other between the segments and the counter-electrode. The apparatus of the invention comprises, for each, an individual supply circuit comprising first means for setting a predetermined value for the current applied in a first of the two directions so as to set the segment in a first of the two states and second means for allowing a short-circuit current to pass in the second of the two directions so as to set the segment in the second of the two states.

BRIEF DESCRIPTION OF THE DRAWING

The invention will be described in more detail, by way of example, with reference to the accompanying drawings, wherein.

DETAILED DESCRIPTION OF THE PREFERRED EMBODIMENT

Figure 1:
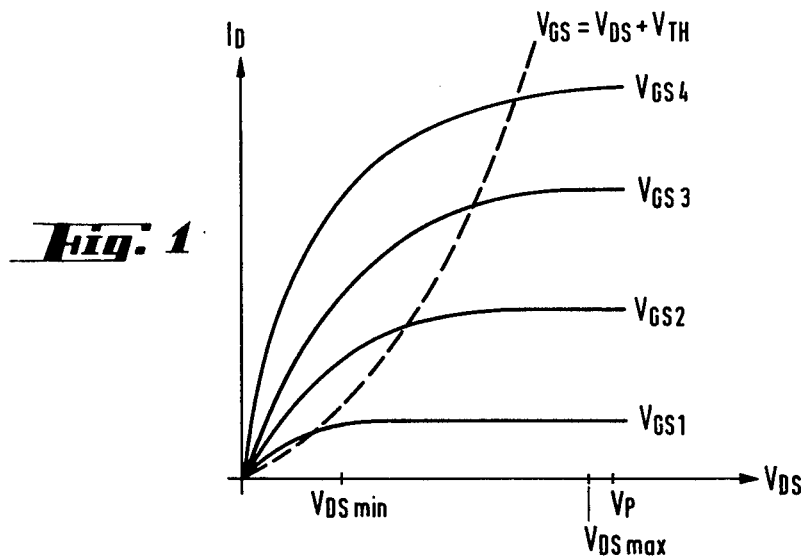
FIG. 1 represents the variation of the drain current of an MOS transistor as a function of its drain-source voltage for different gate-source voltages.

Field-effect transistors are particularly suitable for regulating the intensity of the current in the circuits for supplying the segments of the electrochromic display cells. If the characteristics of field-effect transistors are examined, particularly insulated gate transistors (MOS type), and more precisely the curves representing the variation of their drain current $I_D$ as a function of the voltage $V_{DS}$ of this drain with respect to their source, with the bias voltage $V_{GS}$ of their gate with respect to the source taken as parameter (FIG. 1), it can be noted that a saturation region exists in which the intensity of the current $I_D$ remains substantially constant. This region is that for which, as a first approximation at the very least, $V_{GS} \leq V_{DS} + V_{TH}$, where $V_{TH}$ is the threshold voltage of the transistor.

In display cells currently used, in which electrodes of tungsten oxide ($WO_3$) are separated from a counter-electrode of graphite by an electrolyte with a base of concentrated sulphuric or sulphuric acid, the voltage between an electrode and the counter-electrode varies between two values $V_{Amin}$ and $V_{Amax}$, depending upon whether this electrode is effaced or coloured. The voltage $V_{DS}$ of a transistor, whose gate is biased by a constant voltage $V_{GS}$, connected in series with this electrode, consequently varies from $V_{DSmax} = V_P - V_{Amin}$ to $V_{DSmin} = V_P - V_{Amax}$, where $V_P$ is the supply voltage applied between the counter-electrode and the source of the transistor.

For this transistor to work in its saturation region even at its voltage $V_{DSmin}$, it is necessary to have $V_{GS} \leq V_{DSmin} + V_{TH}$, that is to say, $V_{GS} \leq V_P - V_{Amax} + V_{TH}$.

For example, if $V_P = 1.55$, $V_{Amax} = 1.2$ V and $V_{TH} = 0.35$ V, which are current values, it is necessary to have $V_{GS} \leq 0.7$ V.

The method of creating this bias voltage and applying it to the gates of the transistors controlling colouring of the segments will be described below.

All other conditions being the same, the saturation current of an MOS transistor is directly dependent upon the dimensions (length and width) of its channel. In particular, if a set of transistors forming part of one and the same integrated circuit and having, for example, the same length of channel, is biased by one and the same voltage $V_{GS}$, the saturation current which flows in each transistor is proportional to the width of this channel. The segments of an electrochromic display can therefore be easily supplied with the exact charge needed for their colouring by being connected, individually, to transistors all biased by the same voltage $V_{GS}$, made conductive for a predetermined time when the segment which is connected to them is to change from its effaced state to its coloured stage, all having the same channel length and each having a channel width selected so that the saturation current of the transistor corresponding to the voltage $V_{GS}$ is equal to the ratio of the needed charge at the time during which the current is passed. The channel types of these transistors are obviously chosen with regard to the direction of the needed current.

In a display like that described above, a coloured segment in fact forms with the counter-electrode and the electrolyte which separates them a sort of battery, whose electromotive force is sufficient to cause a current to pass when its terminals, that is to say the segment and the counter-electrode, are short-circuited. This current, which causes the effacing of the segment, is limited and then reduced to zero by the internal resistance of the cell, which becomes infinite when the segment is effaced.

A coloured segment can therefore be effaced by short-circuiting it with the counter-electrode through a transistor whose gate is connected to the supply voltage. In these conditions, the transistor does not work in its saturation region and the current it conducts is not constant. One simply determines its dimensions, that is to say its internal resistance, so that effacing of the segment is produced quite rapidly.

Figure 2:
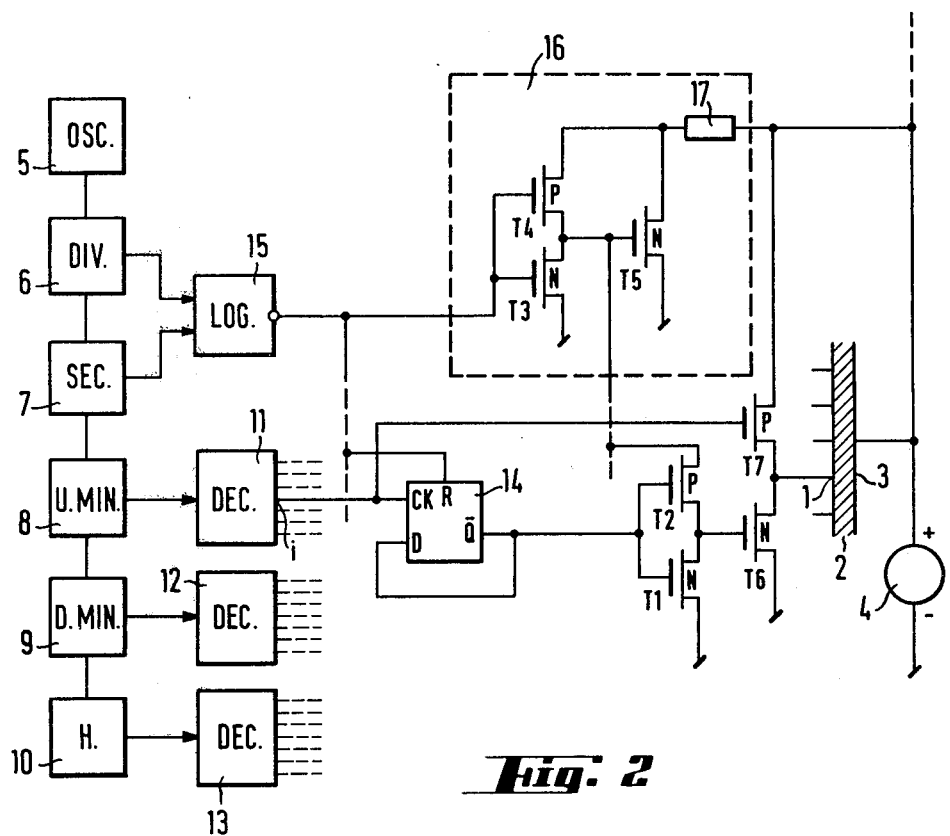
FIG. 2 is a block diagram of the electrical circuits of the invention for a watch equipped with an electrochromic display.

The particular illustrative embodiment depicted in FIG. 2 relates to the application of the invention to the supply and control of an electrochromic cell effecting the display of hours and minutes on a watch, which in this particular instance is a watch with a four digit digital display.

FIG. 2 illustrates the electrical circuits of a watch equipped with an electrochromic display cell constituted by electrode segments 1 formed from an electrochromic material and separated by an electrolyte 2 from a counter-electrode 3 common to the various segments. In this embodiment, the electrode segments 1 are formed of a layer of tungsten oxide disposed on a transparent substrate, the counter-electrode 3 is of finely divided graphite, and the electrolyte 2 has a base of concentrated sulphuric acid or sulphonic acid.

The counter-electrode 3 is connected to the positive pole of a cell 4 which supplies the energy necessary for the watch to work, this energy being principally consumed in the colouring of the electrochromic cells, but also by the electronic control circuit.

A quartz oscillator 5 constitutes the time base. The high frequency pulse signal it produces is processed by a frequency divider 6 so as to supply a 1 Hz frequency signal which is transmitted to a seconds counter 7. From the pulse signal at 1 Hz, the seconds counter 7 supplies a signal at a frequency of 1/60 Hz which is applied to a minute units counter 8. Every ten minutes, the latter delivers a signal to a tens-of-minutes counter 9, which is followed by an hour counter 10.

The oscillator 5, the divider 6 and the stage counters for minute units 8, tens of minutes 9, and hours 10 are conventional in themselves, as are the decoders 11, 12 and 13 which are connected to the outputs of the counters and which allow the data they receive on the state of these counters to be changed into codes expressing the digits to be displayed by the state which each of the segments of the electrochromic display constituting a character has to assume. Since the concern here is with a display of time in up to 59 minutes and up to 12 hours, the three decoders 11, 12 and 13 respectively deliver the signals necessary for encoding the ten possible digits for the minute unit character, the six possible digits for the character indicating tens of minutes, and the twelve possibilities of a group of two digits indicating the hours.

Each decoder has as many outputs as the display of the corresponding character requires segments so as to be able to display successively each of the respective digits or groups of digits. Changing of the character so that one digit changes to the next is obtained by the changes of state of the individual segments from the coloured state to the effaced state, or vice versa, according to their relative dispositions. Each signal obtained at the output of a decoder, such as 11, indicates, depending upon whether it is in logic state "1" or "0", whether the corresponding segment must be in the coloured state or effaced state. (Logic states "1" and "0" mean voltages the same as that of the positive and negative terminal respectively of the cell 4).

Each output of each of the decoders 11, 12 and 13 is connected to the clock input CK of a D-type flip-flop 14. For the sake of simplifying the illustration, only one of these flip-flops (the flip-flop connected to the one output of the decoder 11) is represented in the drawing. The $\overline{Q}$ output of each flip-flop 14 is connected to its input D, so that the flip-flop changes state at each application of a signal "1" to its clock input CK. The input R for resetting each flip-flop 14 to zero is connected to the output of a logic circuit 15, which is usually in logic state "1", which sets all the flip-flops in a state, called the "rest" state, in which their $\overline{Q}$ outputs are in state "1".

The logic circuit 15 is formed of logic gates and receives signals from certain stages of the divider 6 and the seconds counter 7; it is connected so as to deliver a temporary logic signal "0" at its output at the beginning of each minute, that is to say each time the appearance of the display has to change. The stages of the divider 6 are selected so that the output of the logic circuit remains in the state "0" for a time equalling the time necessary for colouring of the segments.

The $\overline{Q}$ output of each flip-flop 14 is also connected to the input of a supply circuit of the corresponding segment 1, that is to say to the gates, connected together, of an n-channel transistor T1 and a p-channel transistor T2, whose drains are also joined together. The source of the transistor T1 is connected to the negative pole of the cell 4, and that of the transistor T2 to the output of a bias voltage generator 16 formed of n-channel transistors T3 and T5, p-channel transistor T4 and a resistor 17.

The drains of the transistors T1 and T2 are connected to the gate of an n-channel transistor T6 whose source is connected to the negative pole of the cell 4 and which is the transistor used as colouring current source for the segment 1 connected to its drain. This drain is also connected to that of a p-channel transistor T7, the source of which is connected to the positive pole of the cell 4 and the gate to the same output of the decoder 11 as drives the corresponding flip-flop 14.

Each of the display segments is connected to a supply circuit identical to that for the segment 1, and therefore comprising the transistors T1, T2, T6 and T7 connected as described above. Only a single circuit has been represented in the drawing for purposes of simplicity.

The drains of the transistors T3 and T4 are connected together and to the gate of the transistor T5, and represent the output of the bias voltage generator 16. This output is connected to the drains of all the transistors T2 of all the supply circuits of the segments. The gates of the transistors T3 and T4 are also connected together and to the output of the logic circuit 15. The sources of the transistors T3 and T5 are connected to the negative pole of the cell 4 while the source of the transistor T4 is connected to the drain of the transistor T5 and, through the resistor 17, to the positive pole of the cell 4.

For most of the time, the output of the logic circuit 15 is in logic state "1". All the flip-flops 14 are therefore in their rest state, with their $\overline{Q}$ outputs in logic state "1"; all the transistors T1 conduct and all the transistors T2 and T6 are blocked.

If the respective output of the decoder 11 is in state "0", the transistor T7 conducts, which short-circuits the electrode segment 1 with the counter-electrode 3 and ensures that this segment is kept in the effaced state. If, conversely, this output is in state "1", the transistor T7 is blocked, and if the segment 1 is in its coloured state, this state is held.

When the output of the logic circuit 15 is at "1", the transistor T3 conducts and the transistor T4 is blocked; the transistor T5 is also blocked. The output of the bias voltage generator 16, and the sources of all the transistors T2 connected to it, are therefore at the potential of the negative pole of the cell 4. In this state, its rest state, the generator 16 consumes no current.

At the beginning of each minute, as seen before, the output of the logic circuit 15 changes to "0" during a time T. During this time T, the transistor T3 blocks and the transistor T4 conducts, which connects the gate and the drain of the transistor T5. In these conditions, T5 behaves as a diode. Its voltage $V_{DS}$, which is equal to its voltage $V_{GS}$, is dependent upon the current it conducts and therefore on its characteristics and the value of the resistor 17. These characteristics and this resistor are selected so that this voltage $V_{DS}=V_{GS}$ is exactly the bias voltage which has to be applied to the gates of the transistors T6 to make them conduct the saturation current necessary for colouring of the segment connected to them in the time T.

At the beginning of each minute, a certain number of outputs of the decoders 11, 12 and 13 also change from state "0" to state "1", thereby indicating that the segments which correspond to them are to be coloured. For purposes of illustration, take this to be the case with the particular output shown of the decoder 11. The input R for resetting the flip-flop 14 to zero changes, as do the inputs of all the other flip-flops, from "1" to "0" at the beginning of each minute and therefore at the instant under consideration. The flip-flop 14 can therefore change state in response to the change from "0" to "1" of its input CK, and its $\overline{Q}$ output changes to "0". The transistors T1 and T2 consequently become respectively blocked and conductive. As T2 receives exactly at its source the bias voltage delivered by the generator 16, the latter is applied to the gate of the transistor T6 which begins to conduct its saturation current. As the transistor T7 is blocked by the signal "1" applied to its gate by the output of the decoder 11, this saturation current causes the segment 1 to colour.

At the end of the time T, the output of the logic circuit 15 changes to "1" again, which resets the $\overline{Q}$ output of the flip-flop 14 to "1". The transistor T1 then becomes conductive again and the transistor T2 blocks. The transistor T6 also blocks, which cuts off the passage of the colouring current. As the transistor T7 remains blocked, the segment 1 is held in its coloured state. Only at the beginning of another minute, when the output i of the decoder 11 changes to "0" again, does the transistor T7 become conductive, thus causing effacing of the segment 1.

At the end of the time T, the signal "1" of the output of the logic circuit 15 makes the transistors T3 and T4 conductive and blocked respectively, which blocks the transistor T5 and sets the output of the bias voltage generator 16 to the voltage of the negative pole. The generator 16 is thus reset into its rest state.

Among possible modifications, the invention is equally applicable to the control of display cells whose segments become colourless when electrical changes are injected into them and colour when they are short-circuited with the counter-electrode. Similarly, transistors, such as T6, and their control circuits could be replaced by more complex circuits ensuring a better control of the colouring currents and the individual setting of these currents. The bias voltage generator could also be made in a different way, if this bias voltage were required to be more stable.

While an illustrative embodiment of the invention has been shown and described above in some detail, it will be understood that various changes and modifications may be made without departing from the spirit of the invention, which is to be limited in scope only by the appended claims.

What is claimed is:

1. Apparatus for controlling an electrochromic display cell having a plurality of electrode segments spaced from a counter-electrode by an electrolyte and disposed for representing different symbols according to those segments which are set in a colored state or in a bleached state by application of a current in one direction or in the other between the segments and counter-electrode, said apparatus comprising:

power supply means having a first and a second terminal, said counter-electrode being directly connected to said second terminal;

control means comprising a plurality of terminals corresponding each to one of said segments and providing each a control signal having a first state when said one segment is to be colored and a second state when said one segment is to be bleached;

means for producing a control pulse whenever at least either one of said segments is to be colored;

generator means responsive to said control pulse for producing a bias voltage pulse;

a plurality of individual supply circuit means connected each between one of said control means terminals and the corresponding segment and comprising each a first field-effect transistor whose source is connected to said first power supply terminal, whose drain is connected to said corresponding segment, and whose channel-width is substantially proportional to the area of said corresponding segment, a switching circuit responsive to said control pulse and to said first state of said control signal for applying said bias voltage pulse to the gate of said first transistor, whereby said first transistor applies a constant current pulse between said corresponding segment and said counter-electrode whenever said corresponding segment is to be set in one of its colored or bleached states, said supply circuit means further comprising a second field-effect transistor whose source is connected to said counter-electrode, whose drain is also connected to said corresponding segment and whose gate is connected to said one of said control means terminals, whereby said second transistor is responsive to said second state of said control signal for short-circuiting said corresponding segment with said counter-electrode whenever said corresponding segment is to be set in the other of its states.

2. Apparatus according to claim 1 wherein said generator means comprises a third field-effect transistor, whose source and drain are respectively connected to said first and, through a resistor, to said second power supply terminal, and a switching circuit responsive to said control pulse for switching the gate of said third transistor from its drain to its source during said control pulse, whereby said bias voltage pulse is produced on said gate of said third transistor during said control pulse.

* * * * *